Aug. 29, 1967  R. B. ALLEN  3,337,896
CAR WASH SYSTEM
Original Filed Feb. 28, 1964  5 Sheets-Sheet 3

INVENTOR.
RUSSELL B. ALLEN
BY
Barnes, Kisselle, Raisch & Choate
ATTORNEYS

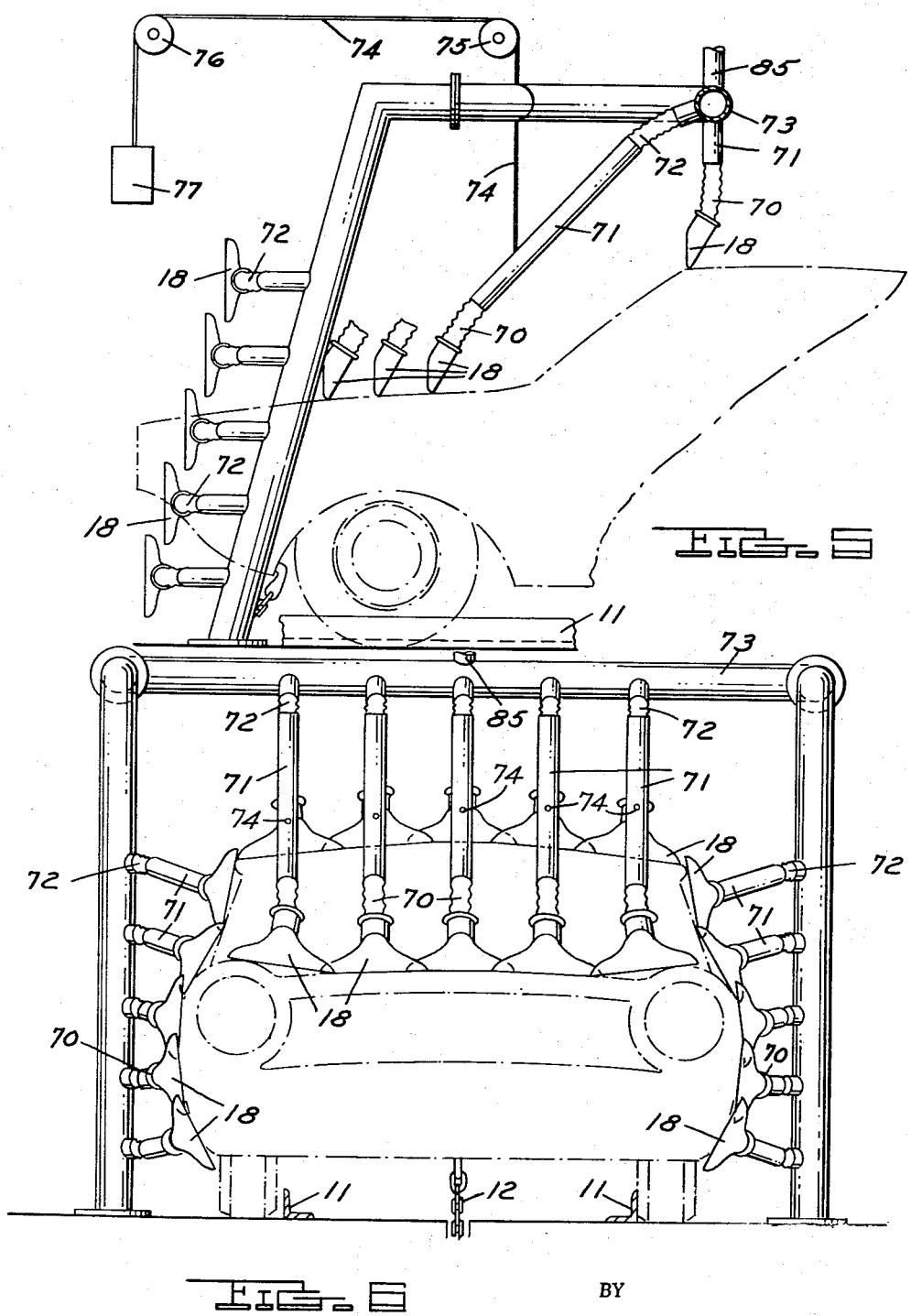

INVENTOR.
RUSSELL B. ALLEN
BY
Barnes, Kisselle, Raisch & Choate
ATTORNEYS

United States Patent Office 3,337,896
Patented Aug. 29, 1967

3,337,896
CAR WASH SYSTEM
Russell B. Allen, 18253 Evergreen,
Detroit, Mich. 48219
Original application Feb. 28, 1964, Ser. No. 348,048, now Patent No. 3,263,341, dated Aug. 2, 1966. Divided and this application Jan. 21, 1966, Ser. No. 522,254
7 Claims. (Cl. 15—302)

This application is a division of my co-pending application Ser. No. 348,048, filed Feb. 28, 1964, issued as Patent No. 3,263,341, dated Aug. 2, 1966.

This invention relates to car washing and particularly to systems for automatically washing cars.

It is an object of this invention to provide a novel method and apparatus for washing cars efficiently and economically; and to provide a car wash system wherein cars are washed substantially automatically without the need for workers; wherein an efficient use is made of heat and power; wherein novel means are provided for washing the surfaces of the cars; and wherein novel means are provided for drying the surfaces of the cars.

In the drawings:

FIG. 5 is a fragmentary side elevational view of another portion of the apparatus shown in FIGS. 1 and 2.

FIG. 6 is a front elevational view of the apparatus shown in FIG. 5, parts being broken away.

FIG. 9 is a view of the nozzle shown in FIG. 8 taken in the direction of the arrow.

Figure 1:
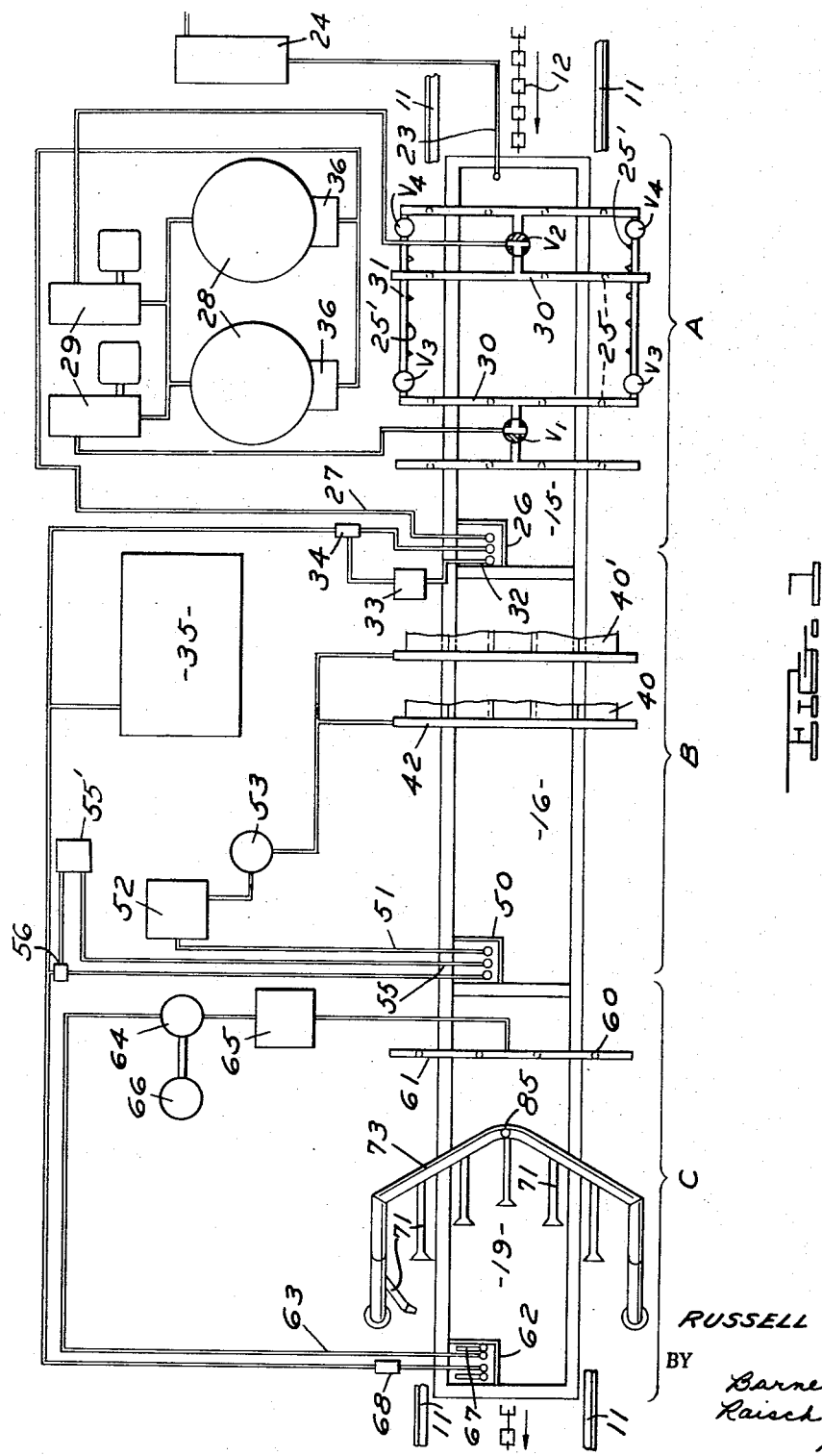
FIG. 1 is a partly diagrammatic plan view of an apparatus embodying the invention.
Figure 2:
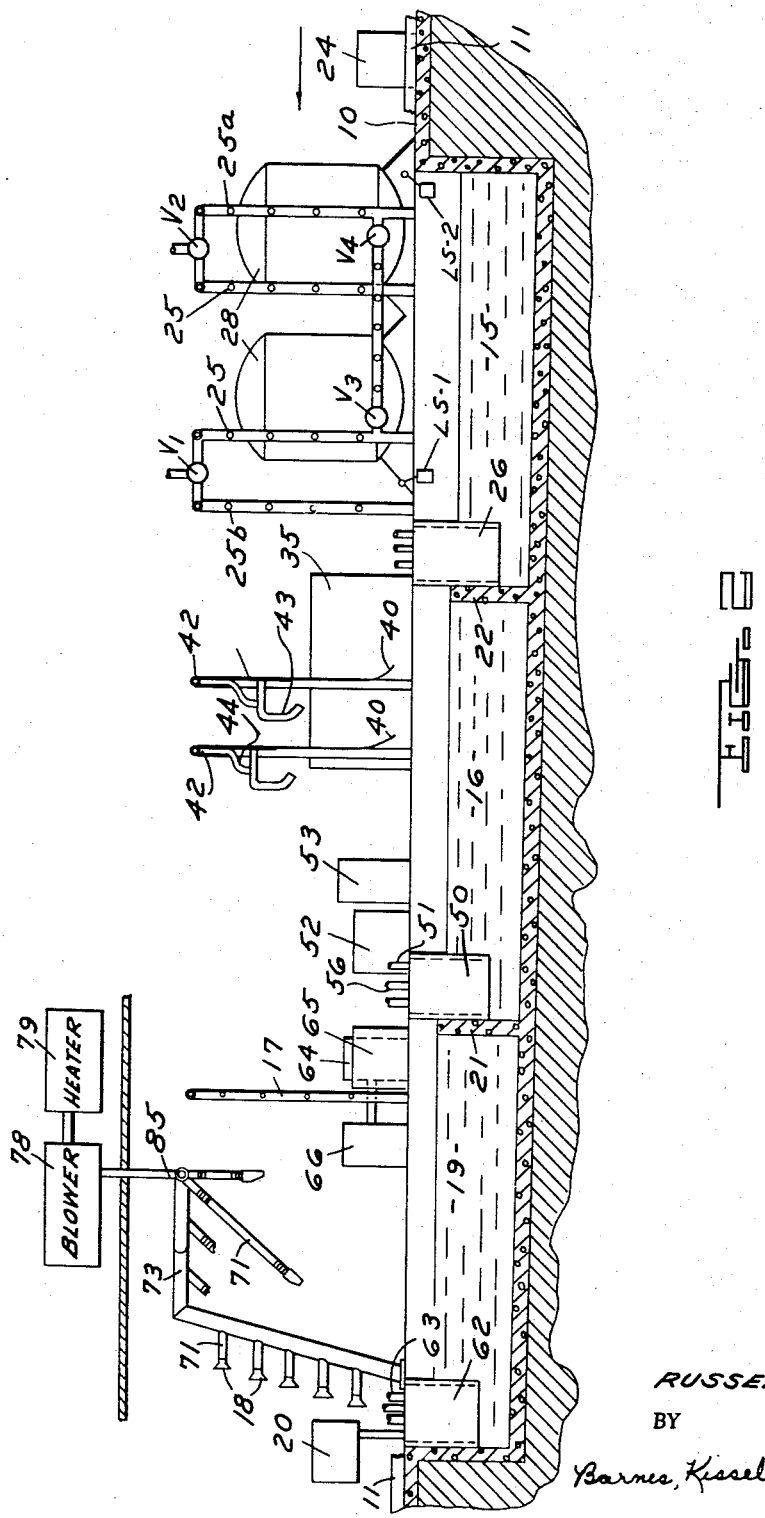
FIG. 2 is a longitudinal sectional view of the apparatus shown in FIG. 1.

Referring to FIGS. 1 and 2, the car wash system embodying the invention comprises a floor 10 having guide rails 11 extending longitudinally thereon and a conveyor 12 for pulling the cars successively along the rails 11 on the floor 10. The conveyor for pulling the cars through the car wash may be of conventional construction.

As a car is driven into position adjacent the right end of the system shown in FIG. 1, it energizes a switch or photoelectrically controlled device, or alternatively a manual switch may be depressed, to actuate the conveyor and initiate the operation of the pumps as hereinafter described.

As each car is pulled along it passes through a first washing section A, then through a wiping section B and finally through a final rinse and drying section C (FIG. 1).

In the washing section A, the surface of the car is subjected to a plurality of high pressured jets of a mixture of heated water and detergent emitted from nozzles 25. The water and detergent is collected in a drain and supply tank 15 in the floor 10 and is heated, filtered and recirculated to nozzles 25.

In the wiping section B, the car is subjected to a novel washing action wherein mats of material are directed by high pressure sprays of heated water against the surfaces of the car. In section B, the water is collected in a drain and supply tank 16, heated, filtered and recirculated.

In the rinse and drying section C, the car is first subjected to a plurality of clear water jets of heated water from nozzles 17 and then is contacted by a plurality of drying heads 18 to dry the surfaces of the car. The rinse water from the nozzles 17 drains into a drain and supply tank 19 and is heated, filtered and recirculated to nozzles 17, as presently described. The level of liquid in the tank 19 is maintained by a level control 20 that controls the addition of the water to the tank 19.

Tank 16 beneath wiping section B is separated from tank 19 beneath rinse and drying section C by a wall 21. Tank 16 is separated from tank 15 beneath washing section A by a wall 22. As the level of liquid in tank 19 rises, the liquid flows over wall 21. Similarly, as the level of liquid in tank 16 rises, the liquid flows over wall 22 into tank 15. Finally, the liquid in tank 15 flows to an overflow 23 and to a drain 24. In this fashion, the relatively clean water from the tank 19 flows in countercurrent successively to tanks 16 and 15 and then to drain, resulting in a substantial saving in water used.

As the last car leaves the final drying section C, it actuates a switch which stops the conveyor and the pumps. The switch may be either mechanically or electrically controlled. Alternatively, an operator can stop the conveyor and pumps by operation of a manual switch.

*First washing section*

First washing section A comprises a plurality of pipes extending about the surfaces of the car and supporting high pressure nozzles 25. Each nozzle 25 is such that it directs a jet of a mixture of heated water and detergent, extending preferably in a fan-like fashion transversely of the car, against the surface of the car at high pressure. Some of the nozzles 25a are directed rearwardly of the direction of movement of the car and others of the nozzles 25b are directed forwardly of the direction of movement of the car so that both the front and rear of each car are subjected to the jets and thereby all portions of the car are washed. As the car is moved past nozzles 25a, it actuates a switch $LS_1$ which operates a three-way valve $V_1$ which, in turn, cuts off the flow of liquid to nozzles 25a and directs the liquid entirely to nozzles 25. As the rear of the car passes the switch $LS_2$, three-way valve $V_2$ is operated to shut off the flow of liquid through the rearmost group of nozzles 25 and supply liquid to the nozzles 25b so that liquid is directed forward against the rear of the car. Check valves $V_3V_4$ are provided in the line that supports the nozzles 25 which direct liquid against the wheels so that liquid can be supplied to these nozzles 25 from each end of the line that supports the nozzles.

The liquid emitted by each nozzle is preferably heated to the optimum temperature for the particular detergent used. The heated liquid mixture also facilitates the removal of ice and heating of the surfaces of the car so that they are easier to dry in the subsequent drying operation. It has been found that pressures of the mixture emitted by each jet should preferably be 700±100 pounds per square inch at a rate of five to seven gallons per nozzle. This produces a vigorous agitation of the dirt on the surface of the car and effectively cleans the car.

As shown in FIGS. 1 and 2, a wall in the form of a baffle 26 is provided at one end of the drain tank 15 with its lower edge spaced from the bottom wall of the tank 15. This isolates a portion of the liquid in the tank.

A pipe 27 extends from the isolated portion of the liquid to filters 28 which are connected to pumps 29 which pump liquid, comprising heated water and detergent, to the pipes 30 that support nozzles 25. Pumps 29 also supply liquid to a longitudinally extending pipe 31 which directs jets of high pressure liquid through nozzles 25' onto the wheels of the car to wash the wheels.

A temperature responsive element 32 is positioned in an isolated portion of the liquid within the baffle 26 and senses the temperature of the isolated portion of the liquid. When the temperature falls below a predetermined level, preferably the order of 160° F., the temperature sensing device 32 operates through a control 33 to actuate a valve 34 and introduce steam from a boiler 35 into the isolated portion of the liquid. This brings the portion of the liquid which is to be fed to the nozzles 25, 25' up to the required temperature for optimum washing and heating of the surfaces of the car for subsequent drying.

By this arrangement an economical use of heat is achieved since only the portion of the liquid which is to be fed to the nozzle is heated and the entire contents of the tank 15 are not heated at any one time. Further savings are achieved in that if the entire tank 15 were kept at elevated temperature, surface evaporation would cause a substantial loss in heat, in addition to increasing the moisture content of the air surrounding the car to a substantial degree.

As shown in FIG. 1, inlet means 36 are provided adjacent each filter 28 to permit the automatic or manual replenishment of the detergent as may be required. Such means may comprise automatic controls for sensing the detergent content of the liquid or merely a manual opening where the detergent can be added as may be required.

*Second washing section*

Figures 3, 4:
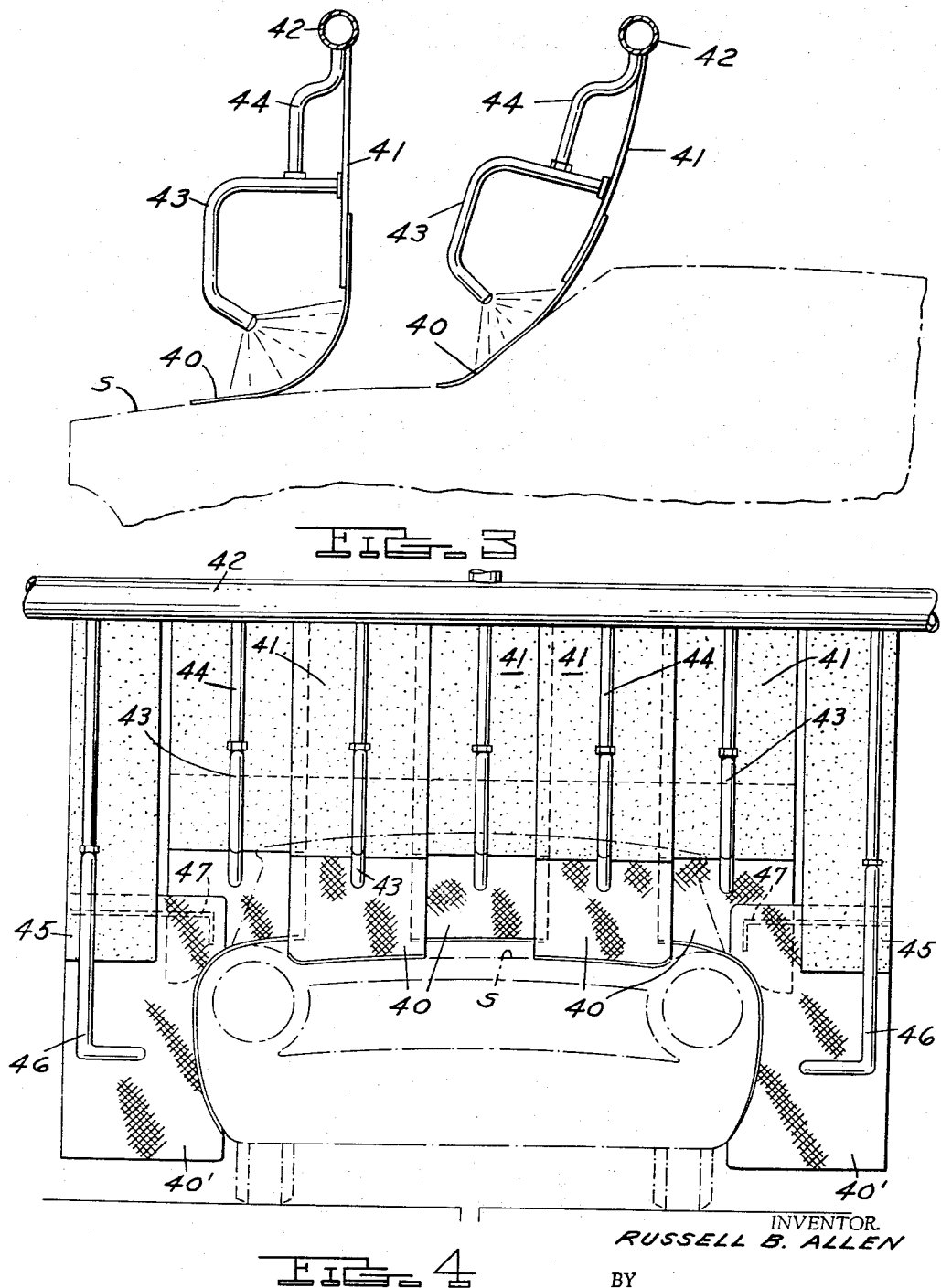
FIG. 3 is a fragmentary side elevational view of a portion of the apparatus shown in FIGS. 1 and 2.
FIG. 4 is a front elevation of the apparatus shown in FIG. 3.

As the car moves to the second washing in section B, it is subjected to the wiping action of a reticulated or foraminous flexible elements 40. Each element 40 is made of flexible open mesh material such as a woven single layer cotton piece having a 1/16" mesh (FIGS. 3 and 4). A plurality of elements 40 are provided in overlapping longitudinally and transversely spaced areas relative to the car (FIG. 4) in order to produce a desired washing action on the entire surface of the car.

As shown in FIGS. 3 and 4, each element 40 is mounted on the lower edge of a piece 41 of flexible material such as rubber. Each piece 41 is hinged at its upper end to a pipe 42. A section of pipe 43 is fixed on the piece of rubber 41 and is bent and has a nozzle thereon to direct a conical spray of liquid, at a high pressure against one surface of the element 40 to force the element against one surface of the car. A flexible hose 44 connects the pipe 43 with the supply pipe 42. The pressure of the conical spray at each nozzle is preferably on the order of 25± pounds per square inch.

On the sides of the car, the elements 40' (FIG. 4) are supported similarly by bodies of rubber 45 that are hinged to vertical pipes 46. A stabilizing plastic member 47 is provided across the upper edge of each element 40' to hold element 40 in position to be engaged by the sides of the car.

As the car is moved through the wiping section B, the elements 40, 40' of reticulated or foraminous material engages the surfaces of the car. The impingement of the high pressure conical spray from nozzles onto the surface of the material of the element 40, 40' forces elements 40, 40' against the surface of the car in a wiping action and at the same time tends to vibrate the elements 40, 40' producing a vibratory effect on the surface that facilitates wiping the film from the car that is usually produced by various elements such as road salt and detergent film.

The pressure emitted by the nozzles at pipe 43 may vary but is preferably on the order of 100±25 pounds per square inch and at a rate of about ten gallons per nozzle. The temperature of the liquid applied to each element 40 should preferably be elevated. Satisfactory results have been achieved when the temperature is 120° F.

As shown in FIGS. 1 and 2, a baffle 50, similar to baffle 26 in tank 15, is positioned in tank 16 with its lower edge spaced from the bottom of the tank 16. This isolates a portion of the liquid in the tank. Liquid from this isolated portion is drawn by a pipe 51 through a filter 52 by pump 53 and, in turn, is directed under pressure against the elements 40, 40'.

As in section A, a temperature control device 55 senses the temperature in the isolated portion of the liquid confined by baffle 50 and actuates a control 55' for a valve 56 to add steam from the boiler 35 to heat the isolated portion of the liquid in the tank 16, which portion is immediately filtered and fed to the nozzles that supply spray at high pressure against the surfaces of the elements 40, 40'.

*Rinsing and drying section*

In the rinsing and drying section C, the car is first subjected to clear water under pressure from nozzles 60 supported on a pipe 61. The car then passes through and is contacted by a plurality of the drying heads 18.

The water that drains from the car collects in the tank 19. A baffle or wall 62 isolates a portion of the tank 19. Liquid from the isolated portion within the baffle 62 is drawn through a pipe 63 by a pump 64 and directed through a filter 65 and then into the pipe 61 which supplies the nozzles 60. A chemical feeder 66 is provided adjacent the inlet of the pump 64 for adding chemicals to neutralize the salt that may collect in the tank 19 from the cars. This chemical insures hat a salt film will not be left upon the car.

As in connection with tanks 16, 15 a temperature responsive element 67 is provided in the isolated portion of the liquid. If element 67 senses a change in temperature, it actuates a valve 68 to supply steam from the boiler 35 to the isolated portion of the liquid so that the liquid passing to the nozzles 60 for rinsing is at elevated temperature. This temperature may vary. Satisfactory results have been achieved when the temperature is 90° F.

The pressure of the clear water emanating from nozzles 60 is preferably about 75–100 pounds per square inch and the rate about ten gallons per minute per nozzle.

Figure 7:
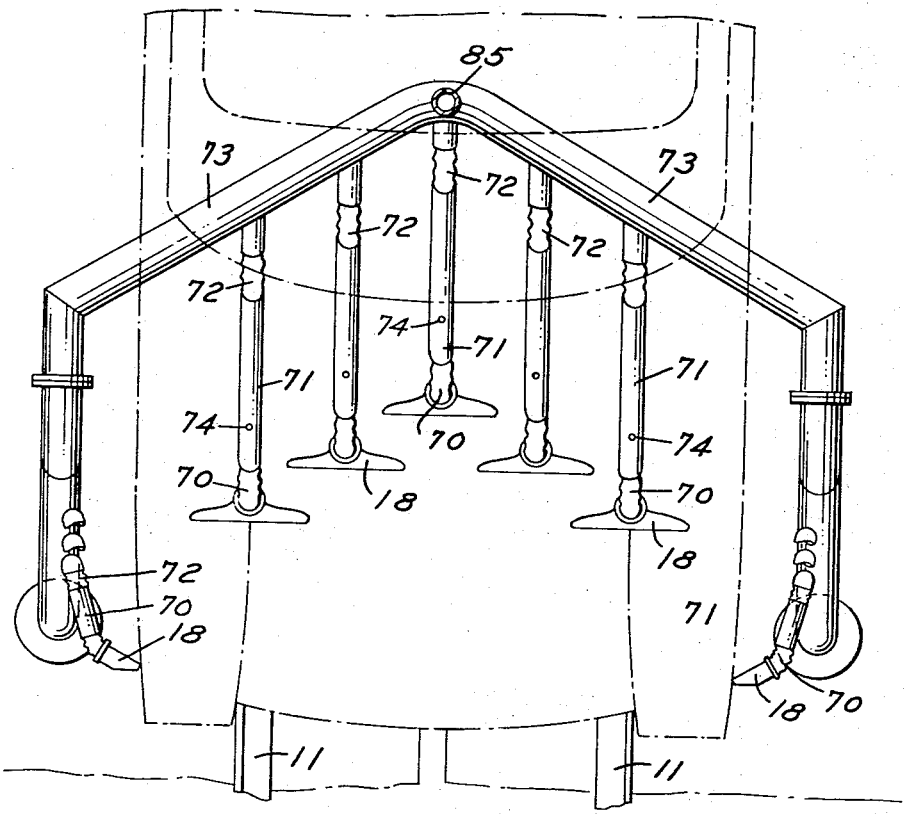
FIG. 7 is a plan view of the apparatus shown in FIGS. 5 and 6, parts being broken away.

As shown in FIGS. 5–7, each drying head 18 is suspended on the end of a flexible tube 70 which, in turn, is mounted on a rigid tube 71. At its other end, each tube 71 is connected by a flexible tube 72 to a header 73 which forms an air distributor. Each tube 71 is counterweighted by a cable 74 trained over pulleys 75, 76 and having a counterweight 77 connected to the end thereof. A blower 78 supplies air from outside the building to a heater 79 under pressure so that heated air passes through connecting pipe 85 to the heater 73 and, in turn, through the flexible tube 72, rigid tube 71 and flexible tube 70 to the head 18. The heated air is preferably at a temperature of 150–160° F. and at a pressure sufficient to produce about 12–15 ounces per square inch at each drying head 18. Heater 79 can be of the gas or oil fired radiant type. The air supplied to each drying head 18 is thus at elevated temperature and can absorb substantially more water. This maintains the surface of the car at an elevated temperature above the dew point so that moisture does not readily condense on the car.

Figure 8:
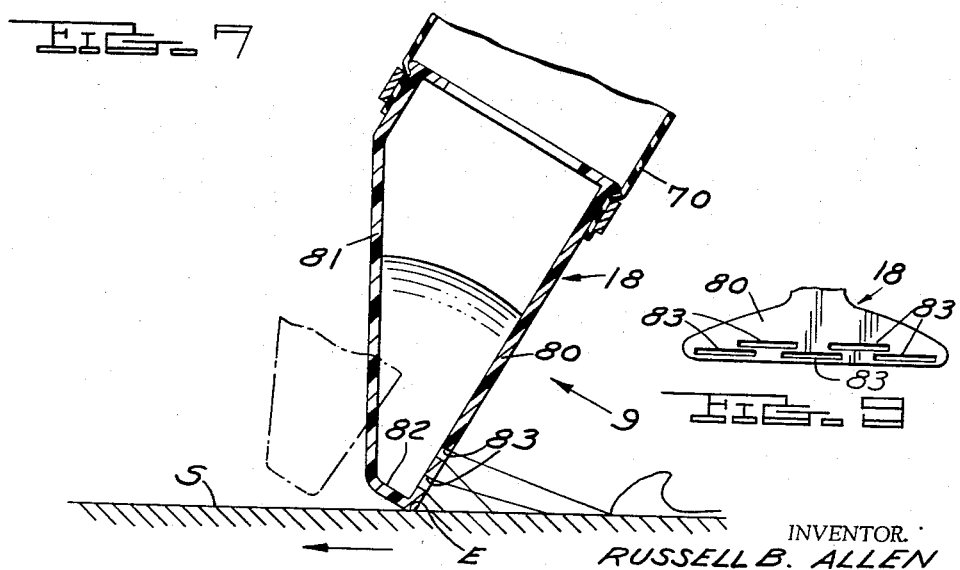
FIG. 8 is a longitudinal sectional view through a portion of a drying nozzle utilized in the apparatus shown in FIGS. 5–7.

Referring to FIGS. 8 and 9, each drying head 18 is made of a low friction material such as high density polyethylene. Each head 18 extends in a direction transversely of the car. As shown, each drying head 18 includes a flat lower portion 80 and inclined upper portion 81 connected by short transverse portion 82. A plurality of staggered and overlapping slots or orifices 83 are provided in the wall 80 extending in a direction generally rearwardly of direction of the movement of the car through the car wash system.

The counterweights 77 are adjusted so that the drying heads 18 are suspended in the path of a surface of a car with the drying heads staggered and overlapping to cover all surfaces of the car as shown in FIGS. 5–7. As the car approaches a drying head 18, the car engages the end of the drying head or the movement of the high pressure air through the slots 83 striking the surface of the car S (FIG. 8) produces a pressure differential that forces the drying head 18 against the car so that the edge E engages and remains in contact with the surface of the car. In this manner, the air emitted from the slots 83 extends and moves rearwardly at high pressure forcing the water off of the surface of the car thereby drying the car. The dry heated air facilitates the drying of the car and assists in maintaining the surfaces of the car at elevated temperature so that the tendency of moisture to condense on the car is eliminated. The dry heated air eliminates the vapor film that tends to form on the surfaces of the car. This combined with the heat previously transmitted to the car surface by the heated liquid mixtures produces a drying without any need for mitting or other manual drying.

It can thus be seen that there has been provided a method and apparatus for washing cars efficiently and economically. In addition, the car wash system embodying the invention permits washing of cars substantially automatically without the need for workers.

I claim:
1. In a car wash system wherein a car is moved in a predetermined path, the combination comprising
 a first section through which the car is moved,
 a plurality of high pressure nozzles in said first section positioned along the path of the top, sides and wheels of the car for directing liquid on said car,
 a drain and supply tank in said first section into which the liquid from said high pressure nozzles drains,
 baffle means in a portion of said tank for substantially separating a portion of the liquid from said tank,
 said baffle means having an inlet adjacent the lower end thereof communicating with the remainder of said tank,
 means for heating said portion separated from the remainder of said tank,
 pump means for drawing liquid from said separated portion and directing it to said nozzles at high pressure,
 filter means interposed between said pump means and said tank,
 a second section through which the car is moved after passing through said first section comprising
 a plurality of wiping assemblies spaced about the top and sides of said car,
 each said wiping assembly including a length of reticulated material and a nozzle associated with said material for directing a liquid spray against one surface of the material at a pressure at least sufficient to hold the material against the car and agitate it,
 a drain and supply tank beneath said second station into which the liquid from said nozzles of said wiping assemblies drains,
 baffle means for substantially separating a portion of the liquid in said drain and supply tank of said second section,
 said last-mentioned baffle means having an inlet at its lower end communicating with the remainder of liquid in the tank,
 means for heating said separated portion of the liquid,
 pump means for drawing liquid from said separated portion and directing it at high pressure to the nozzles of said washing assemblies,
 filter means interposed between said pump means and said tank for filtering the liquid,
 said drain and supply tank of said second section having an overflow for permitting liquid therein to flow into said drain and supply tank of said first section,
 and a third section through which the car is moved after passing through said second section comprising
 a rinse assembly including a plurality of nozzles placed about the top and side of the car for directing liquid against the car,
 said third section including a drying apparatus comprising a blower, an air distributor head to which said blower directs air,
 means for subjecting said car to a drying action in said third section,
 a drain and supply tank beneath said third section into which the liquid from said rinse assembly and said car drains,
 baffle means for substantially separating a portion of the liquid in said drain and supply tank of said third section,
 said last-mentioned baffle means having an inlet at its lower end communicating with the remainder of liquid in the tank,
 means for heating said separated portion of said liquid,
 and pump means for drawing liquid from said separated portion and directing it at high pressure to the nozzles of said rinse assembly.

2. In a car wash system wherein a car is moved in a predetermined path, the combination comprising
 a first section through which the car is moved,
 a plurality of high pressure nozzles in said first section positioned along the path of the top, sides and wheels of the car for directing liquid on said car,
 a drain and supply tank in said first section into which the liquid from said high pressure nozzles containing the dirt from the car drains,
 baffle means for collecting and substantially separating a portion of the liquid from said tank,
 said baffle means having an inlet adjacent the lower end thereof communicating with the remainder of said tank,
 means for heating said portion separated from the remainder of said tank,
 pump means for drawing liquid from said separated portion and directing it to said nozzles at high pressure of at least 600 pounds per square inch,
 filter means interposed between said pump means and said tank,
 a second section through which the car is moved after passing through said first section comprising
 a plurality of wiping assemblies spaced about the top and sides of said car,
 each said wiping assembly comprising a piece of reticulated material and a nozzle associated with each piece of said material for directing a spray against one surface of the material at a pressure at least sufficient to hold the material against the car and agitate it.

3. In a car wash system wherein a car is moved in a predetermined path, the combination comprising
 a first section through which the car is moved,
 a plurality of high pressure nozzles in said first section positioned along the path of the top, sides and wheels of the car for directing liquid on said car,
 a drain and supply tank in said first section into which the liquid from said high pressure nozzles containing the dirt from the car drains,
 means for collecting and substantially separating a portion of the liquid from said tank,
 means for heating said portion separated from the remainder of said tank,
 pump means for drawing liquid from said separated portion and directing it to said nozzles at high pressure of at least 600 pounds per square inch,
 filter means interpoesd between said pump means and said tank,
 a second section through which the car is moved after passing through said first section comprising
 a plurality of wiping assemblies spaced about the top and sides of said car,
 each said wiping assembly comprising a piece of reticulated material and a nozzle associated with each piece of said material for directing a spray against one surface of the material at a pressure at least sufficient to hold the material against the car and agitate it,
 and a third section through which the car is moved after passing through said second section comprising
 a rinse assembly including a plurality of nozzles placed about the top and side of the car for directing liquid against the car, said third section including a drying apparatus comprising a blower, an air distributor head to which said blower directs air, and a plurality of drying heads having low friction contact surfaces for engaging the surfaces of the car, each said head having an air outlet for directing air under pressure and rearwardly of the direction of movement of the car whereby when said head is brought into position adjacent to the car by movement of the car toward said head, the movement of the air rearwardly of the direction of movement of the car causes a differential pressure which pushes the head against the surface of the car, means for flexibly connecting each said head to said air distributor.

4. In a car wash system wherein a car is moved in a predetermined path, the combination comprising a plurality of high pressure nozzles at a station along said path positioned about the top, sides and wheels of the car for directing detergent and water on said car, a drain and supply tank into which the detergent and dirty water from said high pressure nozzles drains, baffle means in a portion of said tank for substantially separating a portion of the detergent and water from said tank, said baffle means having an inlet adjacent the lower end thereof communicating with the remainder of said tank, means for heating said portion separated from the remainder of said tank, pump means for drawing detergent and water from said separated portion and directing it to said nozzles at high pressure of at least 600 pounds per square inch, and filter means interposed between said pump means and said tank.

5. In a car wash system wherein a car is moved in a predetermined path, a wiping section through which the car is moved after passing through a washing section comprising a plurality of wiping assemblies spaced about the top and sides of said car, each said wiping assembly comprising a length of reticulated material and a nozzle associated with said material for directing a liquid spray against one surface of the material at a pressure at least sufficient to hold the material against the car and agitate it, a drain and supply tank beneath said section into which the liquid from said nozzles of said washing assemblies extends, baffle means for substantially separating a portion of the liquid in said drain and supply tank of said section, said baffle means having an inlet at its lower end communicating with the remainder of liquid in the tank, means for introducing steam to said separated portion of the liquid, pump means for drawing liquid from said separated portion and directing it at high pressure to the nozzles of said washing assemblies, and filter means interposed between said pump means and said tank for filtering the liquid.

6. In a car wash system wherein a car is moved in a predetermined path, the combination comprising a plurality of high pressure nozzles at a station along said path positioned about the top, sides and wheels of the car for directing liquid on said car, a drain and supply tank into which the liquid from said high pressure nozzles drains, baffle means in a portion of said tank for substantially separating a portion of the liquid from said tank, said baffle means having an inlet adjacent the lower end thereof communicating with the remainder of said tank, means for heating said portion separated from the remainder of said tank, pump means for drawing liquid from said separated portion and directing it to said nozzles at high pressure of at least 600 pounds per square inch, filter means interposed between said pump means and said tank, at least some of said nozzles extending rearwardly of the direction of movement of the car, others of said nozzles extending forwardly of the direction of movement of the car, and means responsive to the movement of the car for alternately supplying liquid to said rearwardly directed nozzles and said forwardly directed nozzles.

7. In a car wash system wherein a car is moved in a predetermined path, the combination comprising a first section through which the car is moved, a plurality of high pressure nozzles in said first section positioned along the path of the top, sides and wheels of the car for directing liquid on said car, a drain and supply tank in said first section into which the liquid from said high pressure nozzles containing the dirt from the car drains, sump means for collecting and substantially separating a portion of the liquid from said tank, means in said sump means applying heat directly to said portion separated from the remainder of said tank, pump means for drawing liquid from said heated separated portion and directing it to said nozzles at high pressure of at least 600 pounds per square inch, filter means interposed between said pump means and said tank.

References Cited

UNITED STATES PATENTS

| | | | |
|---|---|---|---|
| 1,720,622 | 7/1929 | Breton | 134—60 |
| 1,907,411 | 5/1933 | Timoney | 15—3 |
| 1,934,494 | 11/1933 | Gillespie | 134—123 X |
| 2,637,873 | 5/1953 | Berezny | 15—53 X |
| 2,658,216 | 11/1953 | Shusett et al. | |
| 2,783,892 | 3/1957 | Faler | 134—107 X |
| 2,922,173 | 1/1960 | Lind et al. | 134—123 X |
| 3,009,469 | 11/1961 | Cunningham | 134—123 |
| 3,024,795 | 3/1962 | Roller et al. | 134—123 X |

FOREIGN PATENTS

| | | |
|---|---|---|
| 627,289 | 5/1963 | Belgium. |
| 914,832 | 7/1946 | France. |

ROBERT W. MICHELL, *Primary Examiner.*